(12) United States Patent
Koti et al.

(10) Patent No.: US 11,897,438 B2
(45) Date of Patent: Feb. 13, 2024

(54) FUEL CELL VEHICLE TO REFUEL ANOTHER VEHICLE

(71) Applicant: CUMMINS INC., Columbus, IN (US)

(72) Inventors: Archit N. Koti, Sunnyvale, CA (US); Jean-Baptiste Gallo, Palo Alto, CA (US); Joseph P. Chandraraj, Austin, TX (US)

(73) Assignee: CUMMINS INC., Columbus, IN (US)

( * ) Notice: Subject to any disclaimer, the term of this patent is extended or adjusted under 35 U.S.C. 154(b) by 42 days.

(21) Appl. No.: 17/478,577

(22) Filed: Sep. 17, 2021

(65) Prior Publication Data
US 2023/0092875 A1 Mar. 23, 2023

(51) Int. Cl.
*B60S 5/02* (2006.01)
*H01M 8/0438* (2016.01)
(Continued)

(52) U.S. Cl.
CPC ........... *B60S 5/02* (2013.01); *F17C 5/007* (2013.01); *F17C 13/04* (2013.01); *H01M 8/04201* (2013.01); *H01M 8/04425* (2013.01); *H01M 8/04686* (2013.01); *H01M 8/04776* (2013.01); *B60L 50/70* (2019.02); *F17C 2205/0323* (2013.01); *F17C 2205/0338* (2013.01); *F17C 2221/012* (2013.01); *F17C 2221/033* (2013.01); *F17C 2250/0626* (2013.01); *F17C 2260/036* (2013.01); *F17C 2265/065* (2013.01);
(Continued)

(58) Field of Classification Search
CPC ............ B60S 5/02; F17C 5/007; F17C 13/04; H01M 8/04201; H01M 8/04425; H01M 8/04686; H01M 8/04776; F02M 21/0221

USPC .......................................................... 141/231
See application file for complete search history.

(56) References Cited

U.S. PATENT DOCUMENTS 6,021,823 A * 2/2000 Hale ..................... B60K 15/05
141/192
6,041,762 A * 3/2000 Sirosh ..................... F17C 13/04
123/529

(Continued)

FOREIGN PATENT DOCUMENTS

DE   102005039202 A1   2/2007
DE   102012018515 A1   3/2014
(Continued)

OTHER PUBLICATIONS

DE 102016011924 A1 (English Translation) (Year: 2016).*
JP-2004146113-A (English Translation) (Year: 2004).*

*Primary Examiner* — Timothy P. Kelly
*Assistant Examiner* — Christopher M Afful
(74) *Attorney, Agent, or Firm* — Barnes & Thornburg LLP

(57) ABSTRACT

A system for a fuel cell vehicle includes a providing fuel cell fuel port, a fuel cell fuel storage tank, a fuel cell fuel flowmeter, and a pressure regulator. The fuel cell fuel storage tank is fluidically coupled to the providing fuel cell fuel port. The fuel cell fuel flowmeter is coupled between the fuel cell fuel port and the fuel cell fuel storage tank and is configured to measure flow of fuel cell fuel from the fuel cell fuel storage tank to the providing fuel cell fuel port. The pressure regulator is coupled between the fuel cell fuel flowmeter and the fuel cell fuel storage tank and is configured to control pressure of fuel cell fuel flowing from the fuel cell fuel storage tank to the providing fuel cell fuel port.

11 Claims, 7 Drawing Sheets

(51) Int. Cl.
*H01M 8/04664* (2016.01)
*H01M 8/04746* (2016.01)
*F17C 5/00* (2006.01)
*F17C 13/04* (2006.01)
*H01M 8/04082* (2016.01)
*B60L 50/70* (2019.01)

(52) U.S. Cl.
CPC . *F17C 2270/0168* (2013.01); *H01M 2250/20* (2013.01); *Y02E 60/50* (2013.01)

(56) References Cited

U.S. PATENT DOCUMENTS

| | | | |
|---|---|---|---|
| 7,168,465 B2* | 1/2007 | Mitlitsky | H01M 8/0656 |
| | | | 141/94 |
| 8,770,012 B2* | 7/2014 | Yahashi | G01M 3/26 |
| | | | 73/40 |
| 9,909,889 B2 | 3/2018 | Hall | |
| 11,371,658 B2* | 6/2022 | Gambone | B60L 58/32 |
| 2003/0146106 A1* | 8/2003 | Mitlitsky | H01M 8/18 |
| | | | 205/637 |
| 2004/0261866 A1* | 12/2004 | Suzuki | F17C 13/04 |
| | | | 137/630.15 |
| 2006/0180240 A1 | 8/2006 | Niedzwiechi | |
| 2016/0201851 A1* | 7/2016 | Kim | F17C 5/007 |
| | | | 220/581 |
| 2017/0233243 A1* | 8/2017 | McNicholas | B67D 7/0401 |
| | | | 141/94 |

FOREIGN PATENT DOCUMENTS

| | | | | |
|---|---|---|---|---|
| DE | 102016011924 A1 * | 4/2018 | | F17C 5/007 |
| JP | 2004146113 A * | 5/2004 | | |
| KR | 20140126185 A | 10/2014 | | |
| WO | 2010038069 A2 | 4/2010 | | |
| WO | WO-2011101783 A1 * | 8/2011 | | F17C 5/00 |

* cited by examiner

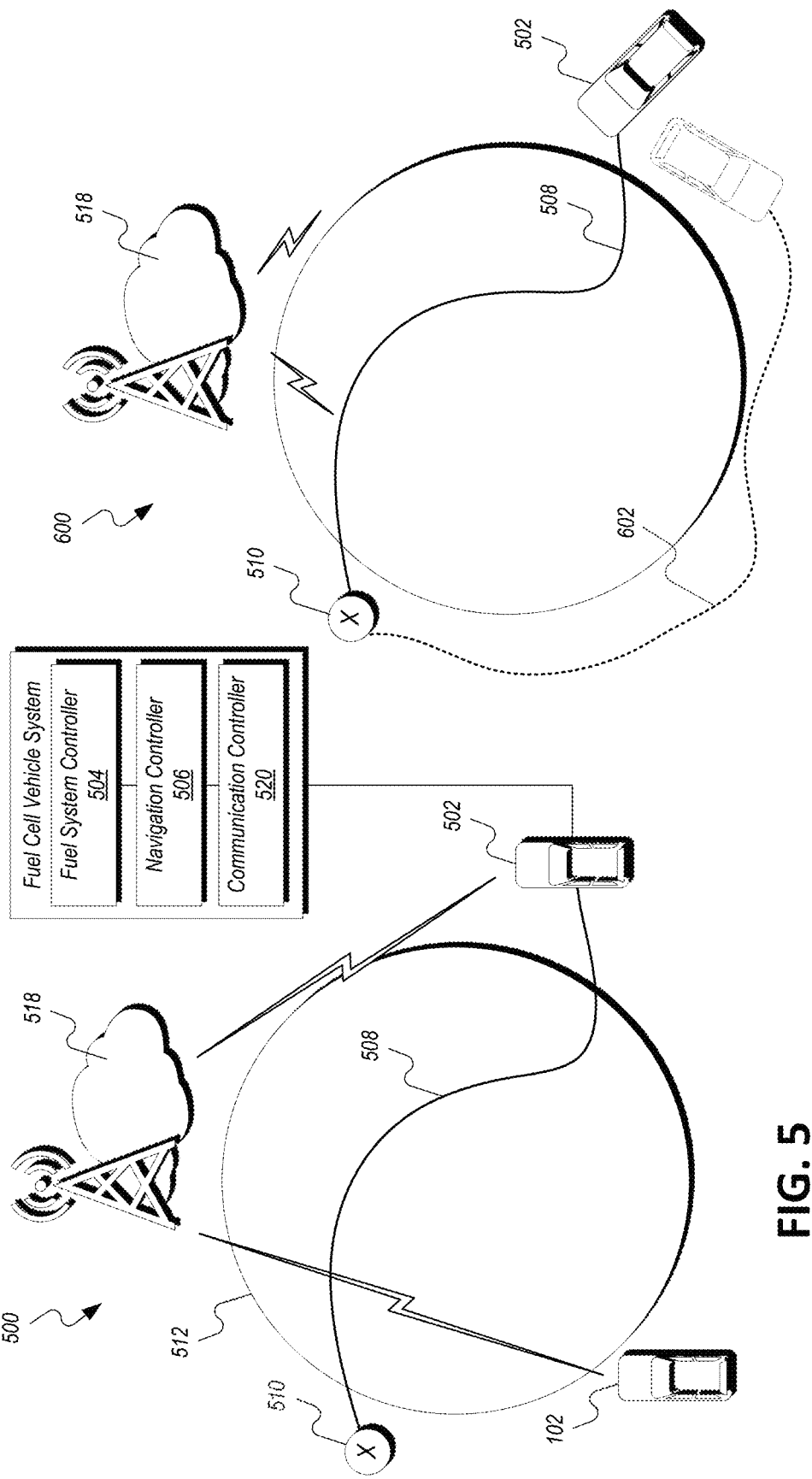

FUEL CELL VEHICLE TO REFUEL ANOTHER VEHICLE

TECHNICAL FIELD

The present disclosure generally relates to system and method for a fuel cell vehicle to refuel another fuel cell vehicle.

BACKGROUND

Fuel cell vehicles represent an example of sustainable transportation technology with a potential to change how people travel, work, play, deliver goods, and provide other vital services. Fuel cell vehicles may be refueled in an amount of time comparable to that of a gasoline vehicle, thereby, alleviating uneasiness some drivers may feel about using alternative fuel vehicles.

SUMMARY

A system for a fuel cell vehicle includes a fuel storage tank coupled to a valve and connected to a refueling port, a pressure regulator, and a fuel system controller. The fuel system controller is configured to, in response to a refueling nozzle being connected to the refueling port, set pressure of the pressure regulator and command the valve to open to initiate transfer of fuel from the fuel storage tank to the refueling port, and in response to the refueling nozzle being disconnected from the refueling port, command the valve to close to prevent transfer of fuel from the fuel storage tank to the refueling port.

A method for a fuel cell vehicle includes, in response to a refueling nozzle being connected to a refueling port of the fuel cell vehicle, setting pressure of a pressure regulator of the vehicle and commanding a valve coupled to a fuel storage tank of the vehicle to open to initiate transfer of fuel from the fuel storage tank to the refueling port coupled thereto. The method includes in response to the refueling nozzle being disconnected from the refueling port, commanding the valve to close to prevent transfer of fuel from the fuel storage tank to the refueling port.

A system for a fuel cell vehicle includes a fuel system controller configured to detect a first amount of fuel available within the fuel cell vehicle, a navigation controller configured to determine a geographic location of the fuel cell vehicle and configured to map a navigation route to a destination of the fuel cell vehicle, the navigation controller configured to determine a second amount of fuel necessary to reach the destination, and at least a portion of the navigation route disposed within a geofenced area. The system includes a communication controller communicatively coupled to a network, wherein the communication controller is configured to: in response to determining, based on one or more signals from the navigation controller and the fuel system controller, that the first amount of fuel is less than the second amount of fuel and that the first amount of fuel will be used up on the portion of the navigation route disposed within the geofenced area, one of: transmit, using the network, a request for a providing fuel cell vehicle, and transmit a user notification indicating that the first amount of fuel will be used up on the portion of the navigation route disposed within the geofenced area.

BRIEF DESCRIPTION OF THE DRAWINGS

The detailed description particularly refers to the following figures, in which:

FIGS. 5 and 6 are block diagrams illustrating example systems for requesting fuel cell transfer from another fuel cell vehicle.

DETAILED DESCRIPTION

The ability to quickly refuel a fuel cell vehicle sidesteps driver concerns regarding an amount of time they may spend at a refueling station to top off their tank or refuel during ordinary course of using the vehicle. However, refueling a fuel cell vehicle when that vehicle is not at the refueling station presents a unique set of challenges. Traditional approaches applicable to gasoline vehicles, such as replenishing a gas tank from a gas can or another container, may be inapplicable to a fuel cell vehicle. More specifically, fuel cell vehicles store fuel in fuel storage tanks in a compressed gaseous state and getting access to this form of fuel outside a refueling station may prove difficult.

A system and method of the present disclosure enables transferring of fuel cell fuel from one fuel cell vehicle to another fuel cell vehicle. The system and method of the present disclosure may be applied in a variety of situations and scenarios where refueling station is difficult to reach or inaccessible. For example, vehicle-to-vehicle refueling of fuel cell vehicles may be utilized to conduct refueling immediately outside a geofenced area where refueling is limited or prohibited, e.g., a tunnel. Moreover, if the vehicle system determines, based, for example, on navigation information, that the fuel cell vehicle may run out of fuel inside a geofenced area with limited refueling options, the vehicle system may alert vehicle operator to change route to avoid the geofenced area so that a refueling event can take place, if needed. In an example, in response to determining that the amount of fuel remaining in the tanks is insufficient to reach the closest refueling station, the vehicle system may issue a refueling event request to multiple mobile/portable fuel cell fuel delivery vehicles located within a predefined distance of the vehicle.

Figure 1A:
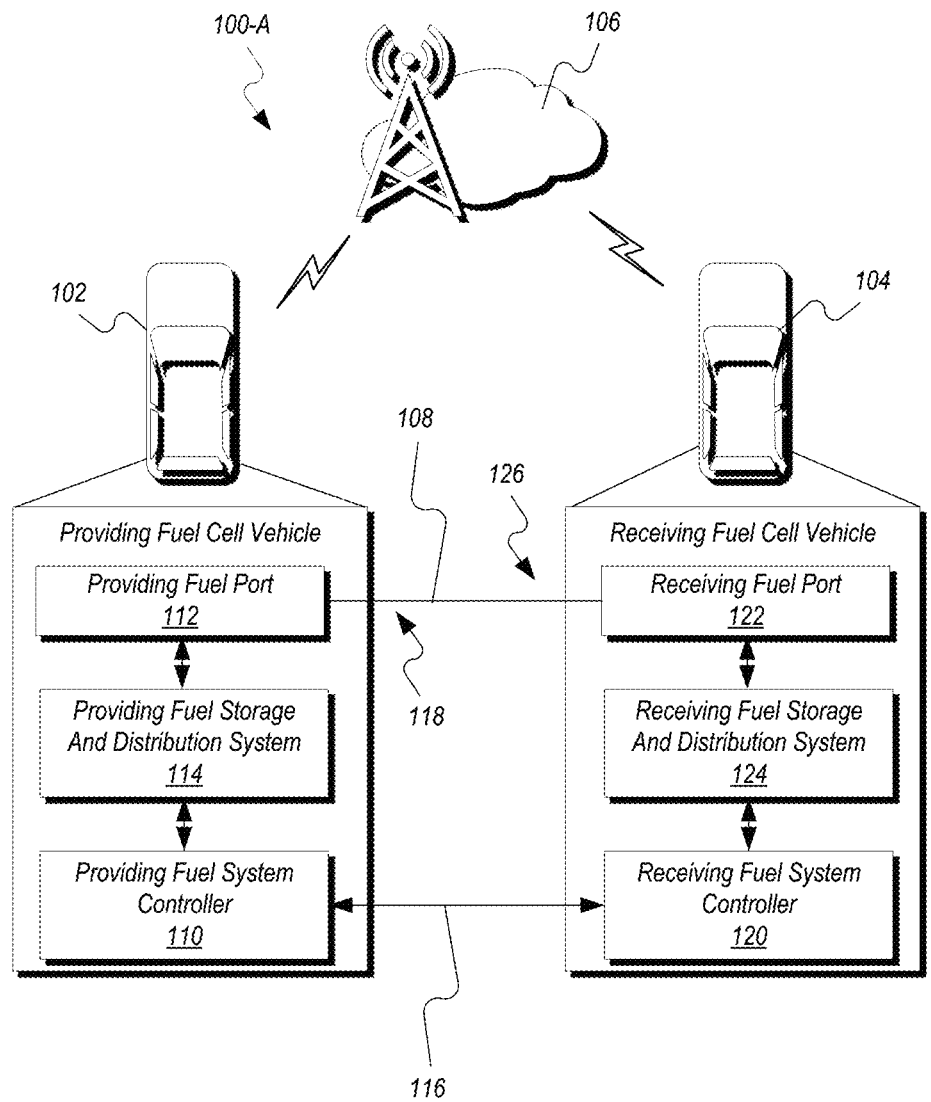
FIG. 1A is a block diagram illustrating an example system for transferring fuel cell fuel from a providing fuel cell vehicle to a receiving fuel cell vehicle.

FIG. 1A illustrates an example system 100-A of vehicle-to-vehicle refueling between two fuel cell vehicles. Example fuel cell vehicles include vehicles powered by fuel cells, vehicles capable of carrying fuel for fuel cells, or a combination thereof. Example fuel for fuel cells includes hydrogen or a compressed natural gas (CNG), including, but not limited to, methanol, ethanol, and ammonia. In some instances, fuel for fuel cells may exclude petroleum and/or diesel fuels. In particular, a first fuel cell vehicle 102 (hereinafter, providing fuel cell vehicle 102) transfers fuel to a second fuel cell vehicle 104 (hereinafter, receiving fuel cell vehicle 104). A fuel system controller 110 of the providing fuel cell vehicle 102 (hereinafter, providing fuel system controller 110) is configured to monitor and control the refueling process. As described, for example, in FIG. 4, the fuel system controller 110 may be configured to communicate with a corresponding fuel system controller 120 of the receiving fuel cell vehicle 104 (hereinafter, receiving fuel system controller 120), such as during a refueling of one vehicle by the other vehicle. In an example, the providing fuel system controller 110 is configured to connect to the receiving fuel system controller 120 using a wireless communication network 106 and/or a controller area network (CAN) 116.

The system 100-A includes a fuel cell refueling connector 108 having a providing end 118 and a receiving end 126. The fuel cell refueling connector 108 is configured to couple a providing fuel storage system 114 of the providing fuel cell vehicle 102 and a receiving fuel storage system 124 of the receiving fuel cell vehicle 104. In one example, the providing end 118 of the fuel cell refueling connector 108 is configured to couple to a providing fuel port 112 of the providing fuel cell vehicle 102 and the receiving end 126 of the fuel cell refueling connector 108 is configured to couple to a receiving fuel port 122 of the receiving fuel cell vehicle 104. The fuel cell refueling connector 108 may be configured to operate at one or more pressure levels, such as, but not limited to, 35 megapascal (MPa), 70 MPa, and so on.

Figure 1B:
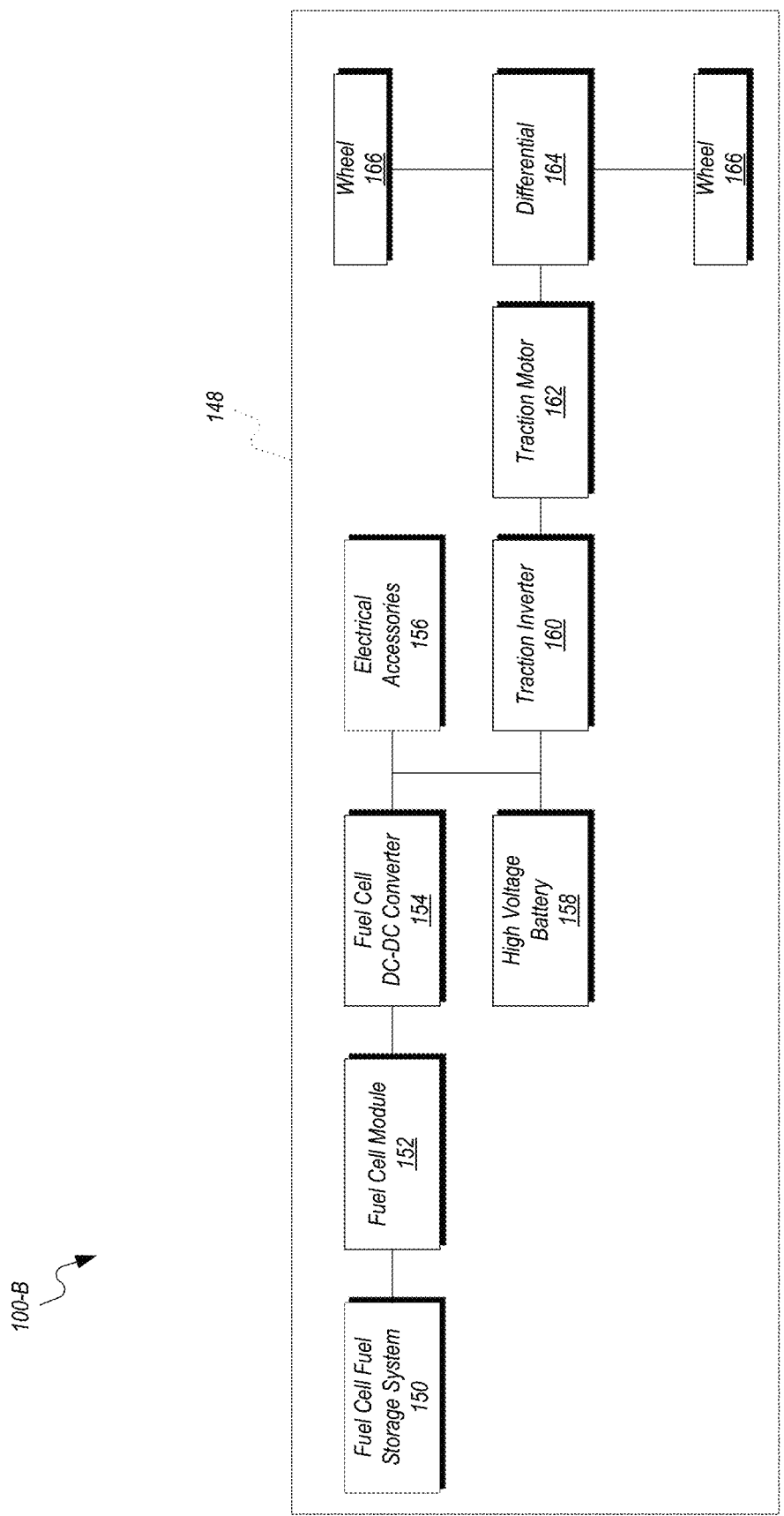
FIG. 1B is a block diagram illustrating an example fuel cell fuel storage and propulsion system of a fuel cell vehicle.

FIG. 1B illustrates an example fuel cell fuel storage and propulsion system 100-B of an example fuel cell vehicle 148. The providing fuel cell vehicle 102 and the receiving fuel cell vehicle 104 may be implemented to include at least a portion of the example fuel cell fuel storage and propulsion system 100-B. The example fuel cell fuel storage and propulsion system 100-B includes a fuel cell fuel storage system 150, a fuel cell module 152, a high voltage battery 158, and a traction motor 162.

Figure 2:
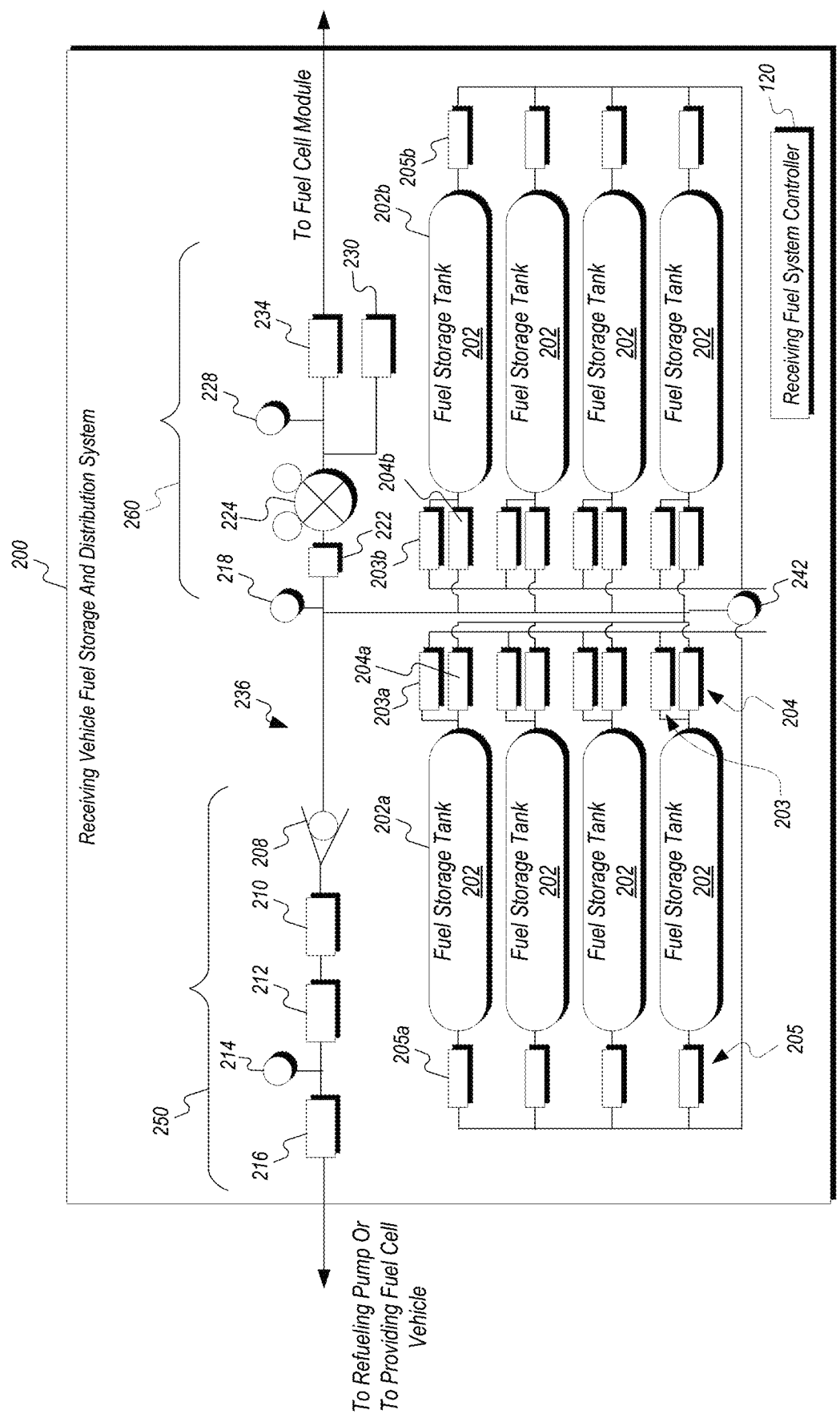
FIG. 2 is a block diagram illustrating an example fuel storage system for the receiving fuel cell vehicle of FIG. 1.

As described in reference to FIG. 2, the fuel cell fuel storage system 150 of the example fuel cell vehicle 148 provides fuel cell fuel (e.g., hydrogen or CNG) to the fuel cell module 152. The fuel cell module 152 uses a chemical process to generate electrical energy. The electrical energy generated by the fuel cell module 152 may be stored in the high voltage battery 158 for use by one or more propulsion or non-propulsion components of the example fuel cell vehicle 148. Further, at least a portion of the electrical energy generated by the fuel cell module 152, whether directly or via the high voltage battery 158, may be used to power the traction motor 162. The traction motor 162 is mechanically coupled to a differential 164 that distributes power to wheels 166 to operate the example fuel cell vehicle 148. Still further, at least a portion of the electrical energy generated by the fuel cell module 152, whether directly or via the high voltage battery 158, may be transferred to power electrical components 156 of the example fuel cell vehicle 148, such as interior lighting, cabin cooling, and infotainment system.

A fuel cell DC-DC converter 154 steps up DC power output by the fuel cell module 152 to a voltage compatible with the electrical accessories 156 and/or the high voltage battery 158. A traction inverter 160 inverts DC power supplied by the high voltage battery 158 and/or by the fuel cell module 152 to AC power compatible with the traction motor 162. The traction inverter 160 may be bi-directional and may convert AC power output by the traction motor 162 operating in a generator mode to DC power for transfer to the high voltage battery 158.

In an example, one or more of the high voltage battery 158, the traction inverter 160, the traction motor 162, the differential 164, and the wheels 166 may be referred to as "a driveline" of the example fuel cell vehicle 148. Thus, "enabling the driveline" and "disabling the driveline" of the example fuel cell vehicle 148 may include enabling and disabling, respectively, at least one of the high voltage battery 158, the traction inverter 160, the traction motor 162, the differential 164, and the wheels 166.

FIG. 2 illustrates an example fuel storage system 200 of the receiving fuel cell vehicle 104 of FIG. 1. While the receiving fuel cell vehicle 104 is described, it is also contemplated that a fuel storage system of the providing fuel cell vehicle 102 may include one or more components similar to those of the example fuel storage system 200. The example fuel storage system 200 includes a fuel system controller 220 configured to monitor and control operation of one or more components of the example fuel storage system 200.

The example fuel storage system 200 includes a plurality of fuel storage tanks 202 that store fuel for a fuel cell (e.g., hydrogen) at a predefined pressure. For example, the predefined pressure in each fuel cell fuel storage tank 202 can be greater than a minimum threshold, such as 350 bar, or within a range, such as, but not limited to, 350-700 bar (5,000-10,000 pounds per square inch (psi)). While the example fuel storage system 200 is illustrated in FIG. 2 as having eight fuel storage tanks 202, the present disclosure is not so limited, and, in other implementations, the example fuel storage system 200 may include a different number of (more or fewer) fuel storage tanks. Each of the plurality of fuel storage tanks 202 is coupled to a corresponding one of a plurality of temperature sensors 204, a corresponding one of a plurality of first relief valves 203, and a corresponding one of a plurality of second relief valves 205. For example, a first temperature sensor 204a of the plurality of temperature sensors 204 is coupled to a first fuel cell fuel storage tank 202a of the plurality of fuel cell fuel storage tanks 202, a second temperature sensor 204b of the plurality of temperature sensors 204 is coupled to a second fuel cell fuel storage tank 202b of the plurality of fuel cell fuel storage tanks 202, and so on.

A flow rate of fuel cell fuel into and out of a given fuel cell fuel storage tank 202, i.e., a change in mass of fuel cell fuel within the fuel cell fuel storage tank 202, causes pressure and temperature within that fuel cell fuel storage tank 202 to change. Accordingly, a change in temperature within the fuel cell fuel storage tanks 202 may occur during, and/or in response to, a flow of fuel into and out of the fuel cell fuel storage tanks 202. The first temperature sensor 204a detects temperature of the first fuel cell fuel storage tank 202a. The second temperature sensor 204b detects temperature of the second fuel cell fuel storage tank 202b. The fuel system controller 220 is communicatively coupled with the first temperature sensor 204a and may enable and disable flow of fuel to and from the first fuel cell fuel storage tank 202a in response to a signal from the first temperature sensor 204a indicating that temperature of the first fuel cell fuel storage tank 202a is less than or greater than a threshold. The fuel system controller 220 is communicatively coupled with the second temperature sensor 204b and may enable and disable flow of fuel cell fuel to and from the second fuel cell fuel storage tank 202b in response to a signal from the second temperature sensor 204b indicating that temperature of the second fuel cell fuel storage tank 202b is less than or greater than a threshold, and so on.

A first pressure relief valve 203a and a second pressure relief valve 205a may be disposed at opposite ends of the first fuel cell fuel storage tank 202a and may be configured to selectively relief pressure within the first fuel cell fuel storage tank 202a. A second pressure relief valve 203b and a second pressure relief valve 205b may be disposed at opposite ends of the second fuel cell fuel storage tank 202b and may be configured to selectively relief pressure within the second fuel cell fuel storage tank 202b. The fuel system controller 220 may be configured to monitor and control operation of each of the first relief valves 203 and the second relief valves 205. In particular, the fuel system controller 220 may be configured to selectively open one or both of the first relief valve 203 and the second relief valve 205 of a given fuel cell fuel storage tank 202 to quicker release at least a portion of the fuel stored within that fuel cell fuel storage tank 202.

Fuel may be transferred to the fuel storage tanks 202 via a refueling branch 250 that, as shown in FIG. 2, includes a check valve 208, and a refueling connector receptacle 216 located serially along the refueling branch 250. In one example, the refueling connector receptacle 216 may include the receiving fuel port 122 of the receiving fuel cell vehicle 104 that couples to the receiving end 126 of the fuel cell refueling connector 108, as described in reference to FIG. 1, such that, when the providing end 118 of the fuel cell refueling connector 108 is coupled to the providing fuel port 112 of the providing fuel cell vehicle 102, the providing fuel cell vehicle 102 and the receiving fuel cell vehicle 104 are interconnected or fluidly connected with one another. Additionally, the refueling connector receptacle 216 is configured to receive a nozzle (not shown) of a refueling tank at a refueling station. In some instances, the receiving fuel cell vehicle 104 may include a refueling connector receptacle similar to the refueling connector receptacle 216 of FIG. 2.

The check valve 208 is a one-way valve configured to permit unimpeded flow of fuel from the refueling connector 216 to the fuel storage tanks 202, such as during refueling at a refueling station or during a vehicle-to-vehicle fuel transfer in accordance with the present disclosure. The check valve 208 also prevents backflow of fuel toward the refueling connector 216. In one example, the refueling branch 250 includes a fill valve 210 disposed between and fluidically coupled to the check valve 208 and the refueling connector receptacle 216. The fill valve 210 is configured to close to stop the flow of fuel into the fuel storage tanks 202 in response to a signal from the fuel system controller 220 indicating that a level of fuel in the fuel storage tanks 202 is greater than a predefined level.

A particulate filter 212 may be disposed between and fluidically coupled to the fill valve 210 and the refueling connector receptacle 216 of the refueling branch 250. The particulate filter 212 prevents foreign material or impurities from entering the fuel cell fuel system of the vehicle. A refueling gauge 214 is disposed between the particulate filter 212 and the refueling connector receptacle 216 of the refueling branch 250 and is configured to measure an amount of fuel transferred into the fuel storage tanks during a given refueling event.

Also shown in FIG. 2, a fuel transfer manifold 236 interconnects the fuel storage tanks 202, the refueling branch 250, and a supply branch 260 that delivers fuel to the fuel cell module 152 for production of motive or propulsion power. In one example, the supply branch 260 includes a pressure regulator 224, a pressure relief valve 230, and a fuel shutoff valve 234.

The pressure regulator 224 of the example fuel storage system 200 is configured to step down (or lower) pressure to provide fuel cell fuel to the fuel cell module 152. The pressure relief valve 230 is configured to relieve pressure within the supply branch 260 in response to pressure within the supply branch 260 portion of the fuel transfer manifold 236 being greater than a predefined threshold pressure, for example, greater than 15 bar-20 bar or 220 pounds per square inch (PSI)-300 PSI.

In some instances, the fuel system controller 220 monitors and controls operation of the pressure relief valve 230 to protect the fuel cell module 152 and other components of the receiving fuel cell vehicle 104 from over-pressure conditions. Additionally, the pressure relief valve 230 may be a spring-loaded valve that remains closed while the pressure in the supply branch 260 is less than a predefined threshold pressure and/or opens when the pressure in the supply branch 260 exceeds a pressure setpoint by a predefined amount.

The fuel shutoff valve 234 interrupts the flow of fuel to the fuel cell module 152 When actuated, the fuel shutoff valve 234 powers down the fuel cell in a controlled manner and closes the cylinder and pressure regulator assembly solenoid valves. The fuel shutoff valve 234 is meant for emergency use only, since interrupting the fuel flow to a fuel cell module while it is operating can cause fuel cell damage.

In an example, the supply branch 260 includes a first pressure gauge 218 and a second pressure gauge 228. During operation, fuel cell fuel flows from the fuel storage tanks 202 through the first flow gauge 218 toward the pressure regulator 224. The first flow gauge 218 detects tank pressure when tank valves are open. The second pressure gauge 228 is disposed downstream from the pressure regulator 224 and the pressure relief valve 230 may be configured to serve as feedback in response to pressure adjustments made by the pressure regulator 224 and/or the pressure relief valve 230. The supply branch 260 may optionally include a particulate filter 222 configured to prevent debris and other impurities from entering the fuel cell module 152.

Figure 3:
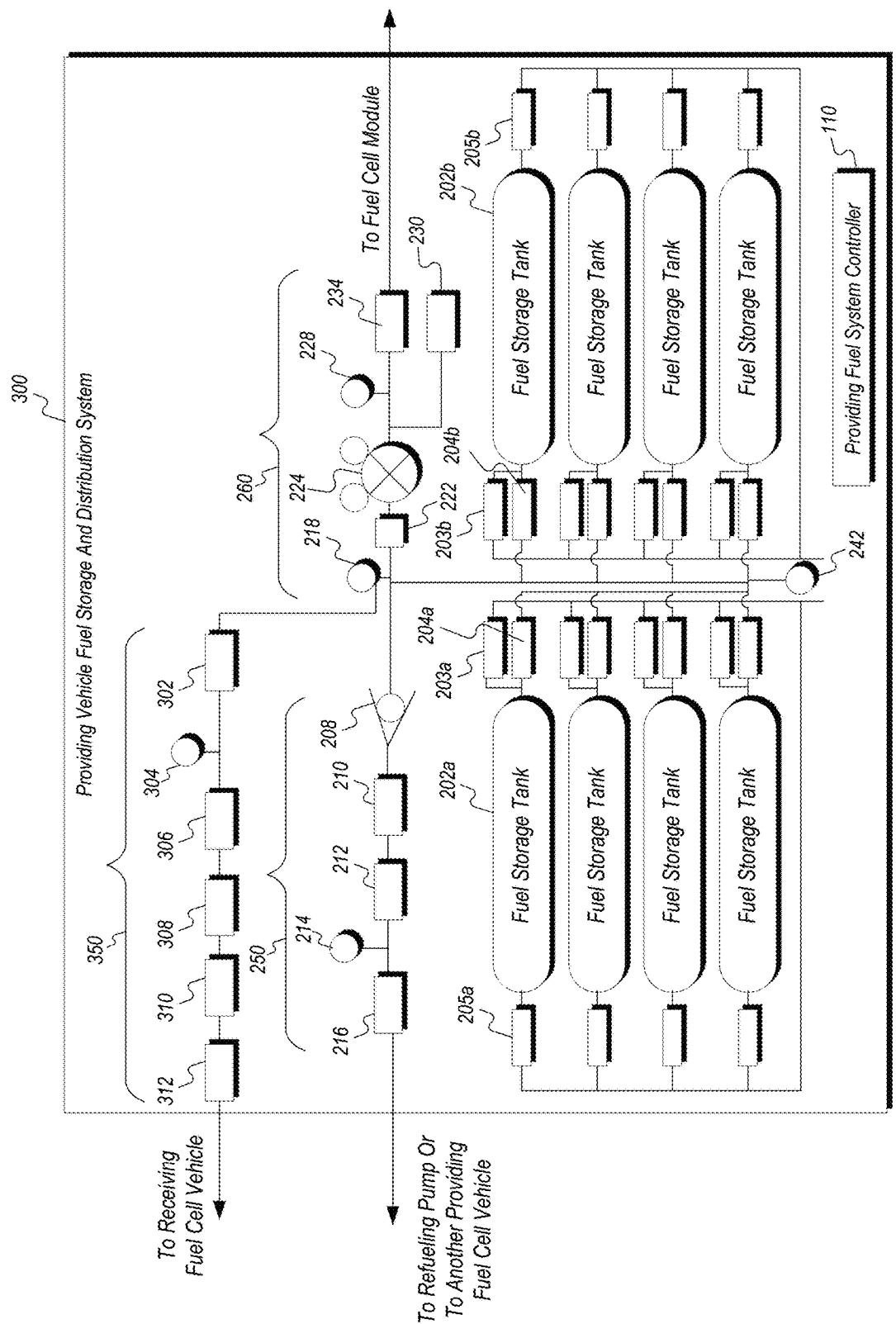
FIG. 3 is a block diagram illustrating an example fuel storage system for the providing fuel cell vehicle of FIG. 1.

FIG. 3 illustrates an example providing fuel system arrangement 300 of the providing fuel cell vehicle 102 of FIG. 1. Components of the example providing fuel system arrangement 300 that correspond to components of the example fuel system arrangement 200 of the receiving fuel cell vehicle 104, as described in reference to FIG. 2, will not be described again for a sake of brevity. Additionally, the providing fuel cell vehicle 102 includes a providing fuel branch 350. The providing fuel branch 350 includes one or more components configured to transfer fuel, e.g., via the fuel cell refueling connector 108, to the receiving fuel cell vehicle 104. The providing fuel branch 350 includes a nozzle 312. In one example, the fuel cell refueling connector 108 is configured to couple to the nozzle 312 at a first end to interconnect the providing fuel cell vehicle 102 and the receiving fuel cell vehicle 104. In one example, the nozzle 312 corresponds to the providing fuel port 112 of the providing fuel cell vehicle 102. The other end of the fuel cell refueling connector 108 is configured to couple to the refueling connector 216 of the receiving fuel cell vehicle 104.

The providing fuel branch 350 includes a providing pressure regulator 306 and a fuel cell fuel flowmeter 308. A providing fuel system controller 110 may be configured to perform one or more operations corresponding to the fuel system controller 220 described in reference to at least FIG. 2. The providing fuel system controller 110 may be configured to perform one or more operations to monitor and control components of the providing fuel branch 350 to enable a transfer of fuel from the providing fuel cell vehicle 102 consistent with the present disclosure. As understood by one skilled in the art, the providing fuel system controller 110 may be configured to perform other functions consistent with the present disclosure.

The providing pressure regulator 306 may be configured to boost (or increase) pressure within the providing fuel branch 350 to support the flow of fuel to the receiving fuel cell vehicle 104. The fuel cell fuel flowmeter 308 may be configured to measure an amount of fuel cell fuel transferred to the receiving fuel cell vehicle 104. During a given refueling event, the providing fuel system controller 110 may be configured to determine, e.g., based on a difference between a first amount of fuel cell fuel transferred to the receiving fuel cell vehicle 104 and a second amount of fuel cell fuel received at the receiving fuel cell vehicle 104 (as reported by the receiving fuel system controller 120 of the receiving fuel cell vehicle 104), whether a leak is present within the providing fuel branch 350 and/or the refueling connector 108.

The providing fuel branch 350 may optionally include a pressure sensor 304. During a given fuel cell fuel transfer event, the pressure sensor 304 may be configured to detect pressure within the providing fuel branch 350. The providing fuel branch 350 may optionally include a shutoff valve 310. The providing fuel system controller 110 may control operation of the shutoff valve 310 to enable and disable the flow of fuel from the providing fuel cell vehicle 102 to the receiving fuel cell vehicle 104. For example, the providing fuel system controller 110 may be configured to command the shutoff valve 310 to open to initiate the flow of fuel from the providing fuel cell vehicle 102 in response to predefined operating conditions being met.

Figure 4:
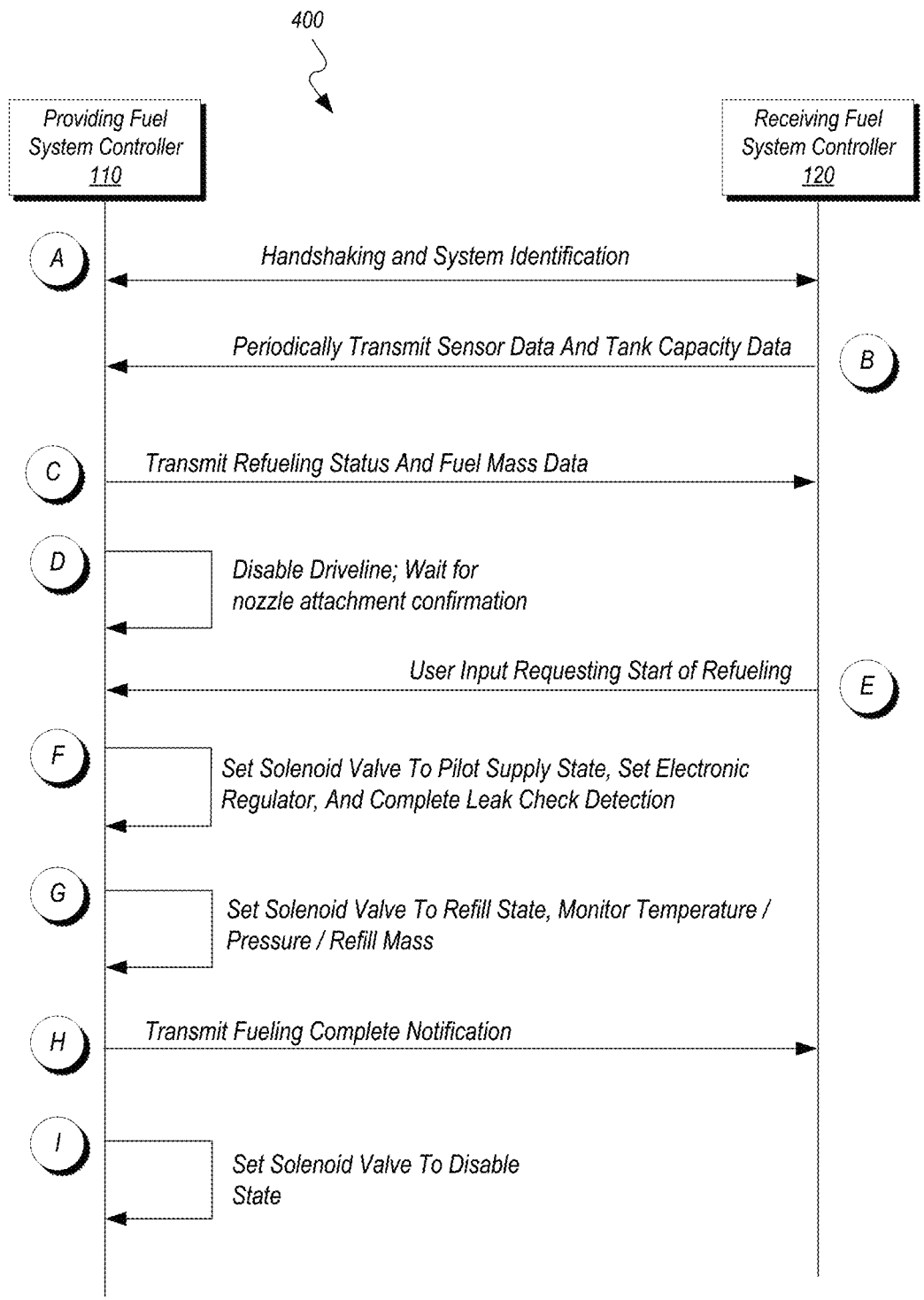
FIG. 4 is a block diagram illustrating an example signal flow between a providing fuel system controller and a receiving fuel system controller.

As described in reference to at least FIG. 4, the example operating conditions for initiating the flow of fuel cell fuel may include, but are not limited to, a pressure within the providing fuel branch 350 being greater than and/or less than predefined one or more threshold pressure values, a communication between the providing fuel system controller 110 and the receiving fuel system controller 120 being successfully established and/or a handshake procedure being successfully completed, an amount of fuel cell fuel within the fuel storage tanks 202 being greater than a predefined amount, and so on. Completing the handshake procedure may include exchanging one or more messages between the providing fuel system controller 110 and the receiving fuel system controller 120 prior to initiating exchanging data with one another, such as, transmitting, receiving, and responding to messages indicating a request to connect and/or transmitting, receiving, and responding to messages indicating a confirmation, acknowledgement, and/or authorization to establish communication. Messages exchanged during the handshake procedure may include one or more checksum segments used to verify legitimate requests and/or to ensure that the message has been received without becoming corrupted.

As another example, the providing fuel system controller 110 may be configured to command the shutoff valve 310 to close to stop and/or prevent the flow of fuel cell fuel from the providing fuel cell vehicle 102 in response to predefined operating conditions being met. As described in reference to at least FIGS. 4 and 7, the example operating conditions for stopping and/or preventing the flow of fuel may include, but are not limited to, a pressure within the providing fuel branch 350 being greater than and/or less than predefined one or more threshold pressure values, a communication link between the providing fuel system controller 110 and the receiving fuel system controller 110 being unsuccessful or being interrupted and/or a completion of a handshake procedure being unsuccessful, an amount of fuel within the fuel storage tanks 202 being less than a predefined amount, and so on. The providing fuel system controller 110 may also stop or prevent the flow of fuel from the providing fuel cell vehicle in response to detecting that an error or a diagnostic fault occurred within the providing fuel cell vehicle 102.

The providing fuel branch 350 may optionally include a filter 302 configured to filter fuel being transferred from the providing fuel cell vehicle 102 to remove moisture, debris, and/or undesirable particulates to prevent a transfer thereof to the receiving fuel cell vehicle 104.

FIG. 4 illustrates an example signal flow diagram 400 for transferring fuel from the providing fuel cell vehicle 102 to the receiving fuel cell vehicle 104. One or more operations of the flow diagram 400 may be performed by one of communication controllers and/or sensors of the providing fuel cell vehicle 102 and the receiving fuel cell vehicle 104, as discussed in reference to at least FIGS. 1-3. For example, operations of the flow diagram 400 may be performed by and between the providing fuel system controller 110 and the receiving fuel system controller 120 described in reference to FIG. 1.

One or more operations of the flow diagram 400 may be performed in response to the refueling connector 108 being coupled to the providing fuel port 112, such as the nozzle 312, and/or the receiving fuel port 122, such as the receptacle 216. In some examples, the providing fuel system controller 110 and/or the receiving fuel system controller 120 may be configured to detect when a fuel cell vehicle capable of providing and/or receiving fuel from another fuel cell vehicle is present within a predefined distance and may initiate a communication link in accordance with the present disclosure. In other examples, the providing fuel system controller 110 and/or the receiving fuel system controller 120 may be configured to broadcast messages and/or detect broadcasted messages indicating that a refueling opportunity is available, such as indicating that the fuel cell vehicle is capable of providing vehicle-to-vehicle refueling and/or that the fuel cell vehicle is in need of refueling and is capable of accepting fuel via a vehicle-to-vehicle refueling event. The providing fuel system controller 110 and/or the receiving fuel system controller 120 may be configured to initiate operations of the flow diagram 400 in response to detecting such a broadcast.

At a time A, the providing fuel system controller 110 and the receiving fuel system controller 120 exchange one or more messages to perform handshaking and system identification process. At a time B, the receiving fuel system controller 120 transmits, to the providing fuel system controller 110, one or more signals including data indicating one or more operating parameter values of the receiving fuel cell vehicle 104, such as values of operating parameters captured by one or more sensors of the receiving fuel cell vehicle 104, and/or data indicating a capacity of the fuel storage tanks of the receiving fuel cell vehicle 104. In some instances, the receiving fuel system controller 120 transmits the one or more signals to the providing fuel system controller 110 periodically and/or in response to one or more signals or commands from the providing fuel system controller 110.

At a time C, the providing fuel system controller 110 transmits, to the receiving fuel system controller 120, a signal including data indicating a refueling status and fuel mass. At time D, the providing fuel system controller 110 disables one or more driveline components of the providing fuel cell vehicle 102, such as, at least one of the high voltage battery 158, the traction inverter 160, the traction motor 162, the differential 164, and the wheels 166. The providing fuel system controller 110 then waits for a confirmation that the refueling connector 108 has been attached to the nozzle 312 of the providing fuel cell vehicle 102 and/or the receiving fuel cell vehicle 104.

At a time E, the receiving fuel system controller 120 transmits a signal to the providing fuel system controller 110 indicating a user request to start a refueling event. The providing fuel system controller 110, at a time F, causes the shutoff valve 310 to enter a pilot supply state, sets operating pressure of the pressure regulator 306 at a predefined pressure, and determines whether a leak is present within the refueling connector 108, the nozzle 312, and/or the fuel receptacle 216.

The providing fuel system controller 110, at a time G, causes the shutoff valve 310 to enter a refill state and initiates monitoring of one or more operating parameters of the providing fuel cell vehicle 102 and/or the receiving fuel cell vehicle 104, e.g., based on signals from the receiving fuel system controller 120 of the receiving fuel cell vehicle 104. The providing fuel system controller 110 is configured to monitor parameters such as, but not limited to, temperature, pressure, and refill mass. At a time H, the providing fuel system controller 110 transmits a signal to the receiving fuel system controller 120 that the refueling event has been completed. The providing fuel system controller 110 may be configured to end the refueling event in response to a corresponding request from the receiving fuel system controller 110, in response to detecting that the refill mass transferred to the receiving fuel cell vehicle 104 is greater than or less than a predefined mass, in response detecting a leak within the refueling connector 108, the nozzle 312, and/or the fuel receptacle 216. At a time I, the providing fuel system controller 110 sets the shutoff valve 310 to a closed state to prevent the transfer of fuel cell fuel to the receiving fuel cell vehicle 104.

FIGS. 5 and 6 illustrate example systems 500 and 600, respectively, for operating a fuel cell vehicle 502 within a geofenced area. In one example, the fuel cell vehicle 502 may be the receiving fuel cell vehicle 104 configured to receive fuel via a vehicle-to-vehicle fuel transfer, as described in reference to at least FIGS. 1-4 and 7. The fuel cell vehicle 502 includes a fuel system controller 504, a navigation controller 506, and a communication controller 520. The fuel system controller 504 is configured to detect a first amount of fuel available within the fuel cell vehicle 502. The communication controller 520 is configured to communicatively couple, via a network 518, the fuel cell vehicle 502 to a unit of infrastructure, e.g., a server, a cloud-based service center, and so on, and/or to the providing fuel cell vehicle 102 in accordance with the present disclosure.

The navigation controller 506 is configured to determine a geographic location of the fuel cell vehicle 502. The navigation controller 506 is configured to map a navigation route 508 to a destination 510 of the fuel cell vehicle 502. In one example, the navigation controller 506 is configured to determine a second amount of fuel necessary to reach the destination 510.

In some instances, the navigation controller 506 is configured to determine whether at least a portion of the navigation route 508 is disposed within a geofenced area 512. The geofenced area 512 includes a geographic area where fuel cell refueling is unavailable. In one example, a geofenced area is an area subject to one or more governmental, municipal, local or federal restrictions, regulations, ordinances, or laws related to operation of vehicles therewithin. The navigation controller 506 may be configured to identify the geofenced area 512 based on look ahead data and information, such as weather, road and/or sea conditions, or by identifying specific emission requirements associated with the geographic area, such as the amount and/or concentration of chemicals or compounds present in the exhaust of the vehicle and/or powertrain, the amount or concentration of hydrogen, water, or a different chemical, compound, or emission factors present in the exhaust or other emittants from the vehicle and/or powertrain, such as electromagnetic emittants, electromagnetic interference, and/or noise.

The communication controller 520 is configured to generate a fuel management strategy for the fuel cell vehicle 502 by determining the estimated power needs of the fuel cell vehicle 502 and/or powertrain of the fuel cell vehicle 502 for the navigation route 508. The communication controller 520 generates the fuel management strategy as the fuel cell vehicle 502 approaches, enters, or resides in the geofenced area 512. As just one example, the communication controller 520 generates the fuel management strategy in response to determining that the fuel cell vehicle 502 may run out of fuel as the fuel cell vehicle 502 approaches, enters, or resides in the geofenced area 512 where fuel cell refueling is unavailable, inaccessible, impermissible, and so on.

To determine whether the fuel management strategy is necessary, i.e., to determine whether the fuel cell vehicle 502 may run out of fuel as the fuel cell vehicle 502 approaches, enters, or resides in the geofenced area 512 where fuel cell refueling is unavailable, the communication controller 520 compares a first amount of fuel available within the fuel cell vehicle 502 and a second amount of fuel necessary to reach the destination 510. In another embodiment, the communication controller 520 determines whether the fuel management strategy is necessary by determining a difference between the first amount of fuel available within the fuel cell vehicle 502 and the second amount of fuel necessary to reach the destination 510.

In response to determining that the first amount of fuel is less than the second amount of fuel and/or that the first amount of fuel will be used up while the fuel cell vehicle 502 is on the portion of the navigation route disposed within the geofenced area 512, the communication controller 520 transmits, using the network 518, a request for the providing fuel cell vehicle 102 to deliver fuel to a predefined location outside the geofenced area 512. Additionally, the communication controller 520 is configured to transmit a user notification indicating that the fuel cell vehicle 502 while the fuel cell vehicle 502 is on the portion of the navigation route 508 disposed within the geofenced area 512. As illustrated in FIG. 6, the communication controller 520 and/or the navigation controller 502 may be configured to generate an alternate route (or a new route) 602 that avoids the geofenced area 512 in response to determining the fuel cell vehicle 502 while the fuel cell vehicle 502 is on the portion of the navigation route 508 disposed within the geofenced area 512. The communication controller 520 and/or the navigation controller 506 is configured to map the new route 502 to the destination 510 allowing for refueling outside of the geofenced area 512 in response to transmitting of the user notification. The communication controller 520 and/or the navigation controller 506 is configured to map the new route 502 to the providing fuel cell vehicle 102 in response to transmitting the request or the providing fuel cell vehicle 102 accepting the transmitted request.

Figure 7:
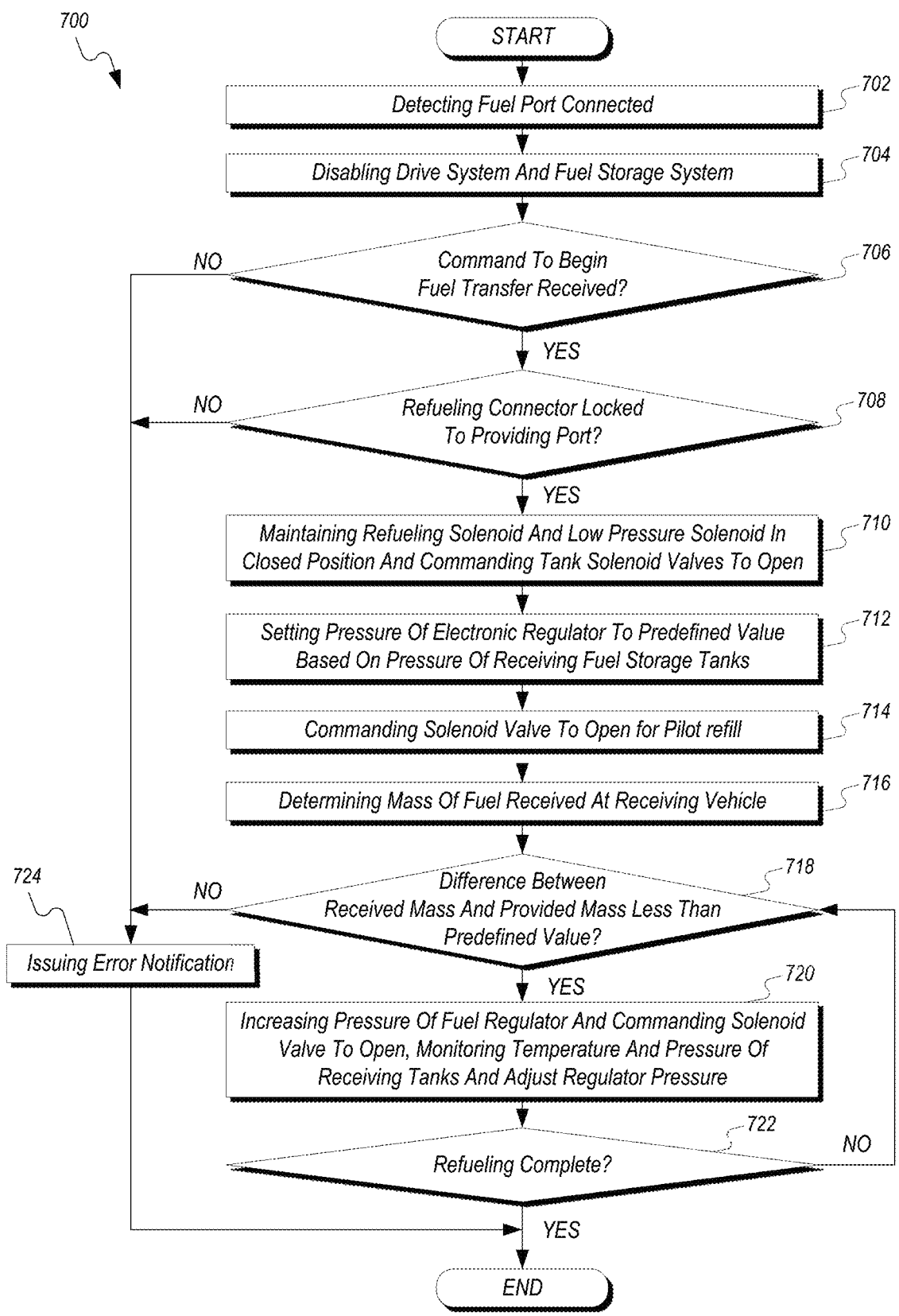
FIG. 7 is a block diagram illustrating an example process flow for transferring fuel from the providing fuel cell vehicle to the receiving fuel cell vehicle.

FIG. 7 illustrates an example process 700 for transferring fuel from the providing fuel cell vehicle 102 to the receiving fuel cell vehicle 104. In one example, one or more operations of the process 700 may be performed by the providing fuel system controller 110. At block 702 the providing fuel system controller 110 detects that the connector 108 has been connected between the providing port 112 and the receiving port 122 (FIG. 1). The providing fuel system controller 110 at block 704 disables one or more components of the drive system and fuel storage system of the providing fuel cell vehicle 102 in response to detecting that the fuel transfer connector 108 has been coupled between the providing fuel cell vehicle 102 and the receiving fuel cell vehicle 104.

At block 706 the providing fuel system controller 110 determines whether a command to the begin fuel transfer has been received. In an example, the providing fuel system controller 110 may be configured to detect a user command issued via a user interface, such as a switch on dashboard or a button on a human machine interface (HMI).

The providing fuel system controller 110 at block 708 checks whether the refueling connector 108 has been locked to the providing port 112. In response to determining that the refueling connector has been locked the providing port 112, the providing fuel system controller 110 at block 710 maintains refueling valve in a closed position and commands valves of the fuel cell fuel storage tanks 202 to open. The providing fuel system controller 110 at block 712 sets pressure of the electronic flow/pressure regulator to a pre-defined value. The providing fuel system controller 110 may set pressure of the flow/pressure regulator to a first pressure greater than a second pressure of the fuel cell fuel storage tanks of the receiving fuel cell vehicle 104. In one example, the first pressure may be greater than the second pressure by a predefined percentage value.

At block 714 the providing fuel system controller 110 commands the valve to open. The providing fuel system controller 110 determines mass of fuel received at the receiving fuel cell vehicle 104 at block 716. The providing fuel system controller 110 at block 718 determines whether a difference between a received mass of fuel and a provided mass of fuel is less than a predefined value. In one example, the providing fuel system controller 110 determines a change in pressure and temperature in the receiving fuel storage tanks. The providing fuel system controller 110 may then determine, based on the change in pressure and temperature, a mass of fuel received at the receiving fuel cell vehicle. The providing fuel system controller 110 may be configured to compare the received fuel mass to the provided fuel mass to determine whether a difference between a received mass of fuel and a provided mass of fuel is less than a predefined value.

In response to determining that the difference between a received mass of fuel and a provided mass of fuel is less than a predefined value, the providing fuel system controller 110 at block 720 increases pressure and opens the valve 310. In some instances, the providing fuel system controller 110 may periodically perform mass check to ensure that the fuel transfer between the providing and the receiving vehicles is without leaks. For example, the providing fuel system controller The providing fuel system controller 110 determines at block 722 whether refueling has been completed. The providing fuel system controller 110 may exit the process 700 in response to determining that refueling has been completed. The process 700 may then end. In other examples, the process 700 may be repeated in response to a determination, by the providing fuel system controller 110, that the connector 108 has been connected between the providing port 112 and the receiving port 122 or in response to a different determination or signal.

While the concepts of the present disclosure are susceptible to various modifications and alternative forms, specific exemplary embodiments are been shown by way of example in the drawings and will be described. It should be understood, however, that there is no intent to limit the concepts of the present disclosure to the particular forms disclosed; on the contrary, the intention is to cover all modifications, equivalents, and alternatives falling within the spirit and scope of the invention as defined by the appended claims.

References in the specification to "one embodiment," "an embodiment," "an illustrative embodiment," etc., indicate that the described embodiment may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A system for a fuel cell vehicle, the system comprising:
   a providing fuel branch configured to transfer a fuel cell fuel from the fuel cell vehicle to a receiving fuel cell vehicle;
   a providing fuel cell fuel port;
   a refueling nozzle;
   a fuel cell fuel storage tank fluidically coupled to the providing fuel cell fuel port;
   a refueling branch configured to transfer the fuel cell fuel to the fuel cell fuel storage tank of the fuel cell vehicle from an external source to refill the fuel cell fuel storage tank, the refueling branch being separate from the providing fuel branch;
   a shutoff valve included in the providing fuel branch and coupled between the providing fuel cell fuel port and the fuel cell fuel storage tank;
   a fuel cell fuel flowmeter included in the providing fuel branch and coupled between the shutoff valve and the fuel cell fuel storage tank, the fuel cell fuel flowmeter being configured to measure flow of the fuel cell fuel from the fuel cell fuel storage tank to the providing fuel cell fuel port;
   a pressure regulator included in the providing fuel branch and coupled between the fuel cell fuel flowmeter and the fuel cell fuel storage tank, the pressure regular being configured to control pressure of the fuel cell fuel flowing from the fuel cell fuel storage tank to the providing fuel cell fuel port;
   a first relief valve coupled to a first end of the fuel cell fuel storage tank and a second relief valve coupled to a second end of the fuel cell fuel storage tank, the second end of the fuel cell fuel storage tank being opposite the first end of the fuel cell fuel storage tank, and the first relief valve and the second relief valve being configured to selectively open or close to release at least a portion of the fuel cell fuel from the fuel cell fuel storage tank to decrease a pressure within the fuel cell fuel storage tank; and
   a fuel cell fuel system controller communicatively coupled to the shutoff valve, the fuel cell fuel flowmeter, and the pressure regulator, the fuel system controller being configured to:
      in response to the refueling nozzle being connected to the providing fuel cell fuel port, set a pressure of the pressure regulator and command the shutoff valve to open to initiate transfer of the fuel cell fuel from the fuel cell fuel storage tank to the providing fuel cell fuel port, and
      in response to the refueling nozzle being disconnected from the providing fuel cell fuel port, command the shutoff valve to close to prevent transfer of the fuel cell fuel from the fuel cell fuel storage tank to the providing fuel cell fuel port.

2. The system of claim 1, wherein the refueling nozzle is connected to the providing fuel cell fuel port about a first end, wherein the refueling nozzle is connected to the receiving fuel cell vehicle about a second end, and wherein the fuel cell fuel system controller sets the pressure of the pressure regulator based on a pressure of a fuel cell fuel storage tank of the receiving fuel cell vehicle.

3. The system of claim 1, wherein the fuel cell fuel system controller is configured to determine a difference between a first pressure of the fuel cell fuel leaving the fuel cell vehicle and a second pressure of the fuel cell fuel arriving at the receiving fuel cell vehicle, and wherein, in response to the difference being greater than a threshold, the fuel cell fuel system controller is configured to identify a leak and command the shutoff valve to close to prevent transfer of the fuel cell fuel.

4. The system of claim 1, wherein the fuel cell fuel system controller is configured to disable a driveline of the fuel cell vehicle prior to initiating transfer of the fuel cell fuel.

5. The system of claim 4, wherein the fuel cell fuel system controller is configured to set the shutoff valve to a pilot supply state following disabling of the driveline and prior to commanding the shutoff valve to open.

6. The system of claim 5, wherein the fuel cell fuel system controller is configured to set the shutoff valve to the pilot supply state in response to receiving a user input indicative of a request to initiate refueling.

7. The system of claim 1, wherein the refueling branch includes a refueling gauge configured to measure an amount of the fuel cell fuel transferred into the fuel cell fuel storage tank of the fuel cell vehicle during a refueling event.

8. The system of claim 7, wherein the refueling branch includes a refueling connector receptacle configured to receive a refueling connector to transfer the fuel cell fuel therethrough and toward the fuel cell fuel storage tank of the fuel cell vehicle, and a check valve fluidically coupled between the refueling connector receptacle and the fuel cell fuel storage tank, wherein the check valve is configured to prevent backflow of the fuel cell fuel toward the refueling connector receptacle.

9. The system of claim 8, wherein the refueling branch includes a fill valve disposed between and fluidically coupled to the check valve and the refueling connector receptacle, and wherein the refueling branch includes a particulate filter disposed between and fluidically coupled to the fill valve and the refueling connector receptacle to prevent foreign material from entering the fuel cell vehicle, the refueling gauge being disposed between the particulate filter and the refueling connector receptacle.

10. The system of claim 9, wherein the fill valve is configured to close to stop fuel cell fuel flow into the fuel cell fuel storage tank in response to a signal from the fuel cell fuel system controller indicating that a level of the fuel cell fuel in the fuel cell fuel storage tank is greater than a predefined level.

11. The system of claim 1, further comprising a filter included in the providing fuel branch coupled between the fuel cell fuel storage tank and the pressure regulator and configured to filter the fuel cell fuel being transferred from the fuel cell fuel storage tank, through the providing fuel cell fuel port, and to the receiving fuel cell vehicle to remove moisture, debris, or particulates from the fuel cell fuel.

* * * * *